United States Patent [19]

Minbiole

[11] 4,141,831
[45] Feb. 27, 1979

[54] APPARATUS FOR REMOVAL OF SOLIDS FROM A SEDIMENTATION ZONE

[75] Inventor: Barry A. Minbiole, Williamsville, N.Y.

[73] Assignee: Union Carbide Corporation, New York, N.Y.

[21] Appl. No.: 844,986

[22] Filed: Oct. 25, 1977

[51] Int. Cl.² .............................................. C02C 1/08
[52] U.S. Cl. .................. 210/195 S; 210/197; 210/202; 210/218; 210/530
[58] Field of Search .................. 210/195 S, 197, 202, 210/218, 219, 220, 221 R, 523, 525, 527–531

[56] References Cited

U.S. PATENT DOCUMENTS

| | | | |
|---|---|---|---|
| 1,916,460 | 7/1933 | Bousman | 210/527 |
| 2,660,557 | 11/1953 | Knowlton | 210/527 |
| 3,235,083 | 2/1966 | Sontheimer et al. | 210/527 X |
| 3,890,231 | 6/1975 | LaClair et al. | 210/530 X |
| 3,977,974 | 8/1976 | Pelton | 210/530 X |
| 4,046,700 | 9/1977 | Glover | 210/523 |

FOREIGN PATENT DOCUMENTS 534637  4/1973  Switzerland ............................ 210/527

Primary Examiner—Robert H. Spitzer
Attorney, Agent, or Firm—Steven J. Hultquist

[57] ABSTRACT

Apparatus for collection and removal of settled solids from the bottom part of a sedimentation zone, comprising a scraper blade attached to a bridge and drawn reciprocatingly and repetitively in a longitudinal path along the sedimentation zone. Means are provided whereby the scraper blade is drawn toward the end walls of the sedimentation zone for transverse alignment therewith at the approach of the bridge to the end walls, so as to eliminate solids accumulation adjacent thereto.

9 Claims, 8 Drawing Figures

APPARATUS FOR REMOVAL OF SOLIDS FROM A SEDIMENTATION ZONE

BACKGROUND OF THE INVENTION

1. Field of the Invention

This invention relates generally to apparatus for treating liquids wherein a liquid-solid is separated in a sedimentation zone and more specifically to an improved means for collecting and removing settled solids from such a zone.

2. Description of the Prior Art

In liquid treatment systems, sedimentation zones are widely employed to separate liquid-solid mixtures into separate liquid and solid phases by gravitational settling of the suspended solids from the liquid-solid mixture. An example is the activated sludge process, wherein activated sludge is mixed with influent wastewater to form a mixed liquor containing the suspended activated sludge solids. After the mixed liquor has been subjected to aeration to effect BOD removal from the wastewater, the mixed liquor is settled in a sedimentation zone to separate out the activated sludge solids, which are returned to the aeration zone, with the separated liquid being discharged from the process system as BOD-reduced effluent.

In the general practice of liquid-solid separation, the sedimentation zone is provided with scraping devices featuring scraper blades which traverse the bottom of the sedimentation basin and move the settled solids to a localized sump or trough means from which the collected solids are withdrawn.

Prior art solids collection and removal devices utilizing scraper blades can be typified by two basic designs — those in which a scraper blade is supported by a reciprocating bridge which moves along a longitudinal, as for example rectangular or arcuate, tank and those in which the bridge moves continually along an orbital path about the axis of a circular tank or around a central circular dividing wall around a fully extended peripheral sedimentation zone. The devices utilizing scraper blades which have heretofore been employed in circular tanks and in fully extended, i.e., 360°, peripheral sedimentation zones are characteristically designed for uni-directional rotation. In these devices, the scraper blades are rigidly connected to the overlying bridge or supporting boom and serve to collect solids and direct same into a solids collection trough adjacent a side wall of the sedimentation zone.

In rectangular or arcuate configuration sedimentation zones, the sedimentation zone is formed by spaced-apart, substantially parallelly aligned side walls and end walls joined to and disposed substantially at right angles with respect to the side walls. In such sedimentation zones, a bridge is typically provided which extends transversely across and above the sedimentation zone. The bridge is driven mechanically in a longitudinal path reciprocatingly and repetitively along the sedimentation zone between the end walls. The scraper blade is attached to the bridge, extending transversely across the sedimentation zone at the bottom thereof with one end adjacent the solids collection trough, extending along one of the side walls, whereby the solids settled in the bottom part of the sedimentation zone are collected and transferred by the blade to the solids collection trough during the travel of the blade along the sedimentation zone in both directions of movement. The scraper blade is typically disposed at an acute angle with respect to the bridge, for maximum solids collection efficiency.

One problem which has arisen in the use of arcuate and rectangular sedimentation zones is the occurrence of unscraped "dead space" adjacent the end walls of the sedimentation zone. Such "dead space" occurs due to the fact that the scraper blade employed in the sedimentation zone is disposed at an acute angle with respect to the reciprocating bridge. Accordingly, a triangular area of unscraped floor surface develops adjacent the end walls of the sedimentation zone. In the unscraped areas, solids accumulate and are not removed from the sedimentation zone. These dead spaces thus represent a loss of collected solids which may be quite critical to system efficiency, as in the activated sludge process where the collected solids are recycled to the aeration zone to effect BOD removal from the influent wastewater.

It may be contemplated that the aforementioned problem of dead space adjacent the end walls of the sedimentation zone may be overcome by the provision of transversely extending solids collection troughs adjacent the end walls of the sedimentation zone. However, this expedient is not suitable in practice inasmuch as the length of the sedimentation zone over which the scraper must operate is very long and in consequence fine sludges tend to be undesirably stirred up and to re-enter suspension during the long traverse of the scraper blade between the end wall regions, thereby lowering solids collection and removal efficiency for the system. In addition, operation in this manner may place heavy mechanical loads on the bridge/scraper assembly which are most desirably avoided in practice to achieve a simple and inexpensive structural configuration.

In practice, the prior art has overcome the occurrence of dead spaces adjacent the end walls of the sedimentation zone by providing "fills" adjacent to the end walls which conform to the triangular shape of the dead space, so that the scraper blade is aligned with the fill surface at the end of its traverse adjacent the end wall. However, the provision of such fills is disadvantageous in that it increases the structural complexity and cost of the sedimentation zone. In addition, since the fills themselves are not scraped, they must be designed to insure that settled solids do not accumulate on their surfaces.

U.S. Pat. No. 3,977,974 discloses means for collecting and removing settled solids from an arcuate sedimentation zone which eliminates the problem of dead space adjacent the end walls of the arcuate sedimentation zone. In the disclosed apparatus, a first cable means joins an inner part of the bridge and an inner part of the scraper blade and second cable means join an outer part of the bridge and an outer part of the scraper blade, for drawing the scraper blade in an arcuate path around the arcuate sedimentation zone in trailing relationship to the points of attachment of the first and second cable means to the bridge. In this arrangement, the cable means nearer the solids collection trough are longer in length than the other cable means such that the scraper blade is disposed at an acute angle with respect to the radially extending bridge during movement of the bridge around the sedimentation zone, whereby the solids settled in the bottom part of the sedimentation zone are collected and transferred by the blade to the solids collection trough during the drawing of the blade around the sedimentation zone in both directions of movement. A third cable means join one of the inner and outer parts of the scraper blade with an opposite part of the bridge, to restrict transverse movement of the scraper blade during movement of the bridge around the sedimentation zone. Means are further provided for shortening the suspended lengths of the first and second cable means at the approach of the bridge to each end wall radial partition, whereby the scraper blade is drawn toward the radial partition for radial alignment therewith, and for increasing the suspended lengths of the first and second cable means after the radial alignment upon reciprocal movement of the bridge toward the other end wall radial partition, so as to eliminate solids accumulation adjacent the end wall radial partitions. Although the apparatus of this patent has proven satisfactory in practice, it requires a number of cable means which are susceptible to breakage. At least three suspension means or cables must be employed, each one representing a potential failure mode for the apparatus.

Accordingly, it is an object of the present invention to provide an improved means for collection and removal of settled solids from the bottom part of a sedimentation zone which eliminates solids accumulation adjacent the end walls of the sedimentation zone.

It is another object of the present invention to provide an improved means of the above type which is mechanically simple and inexpensive to fabricate.

Other objects and advantages of the present invention will be apparent from the ensuing disclosure and appended claims.

SUMMARY OF THE INVENTION

This invention relates to an improved means for collecting and removing settled solids in an apparatus for treating liquids wherein a liquid-solid is separated in a sedimentation zone.

Briefly, the invention relates to a system for separation of a liquid-solid mixture by sedimentation in a sedimentation zone formed by spaced-apart, substantially parallelly aligned side walls and end walls joined to and disposed substantially at right angles with respect to the side walls to provide an enclosed sedimentation volume. Means are provided for introducing and distributing feed liquid-solid in the sedimentation zone for sedimentation therein to form a solids-depleted liquid in the upper part of the zone and a layer of settled solids in the bottom part thereof. Means are provided for discharging solids-depleted liquid from the upper part of the sedimentation zone. A solids collection trough extends along the bottom of the sedimentation zone. A bridge extends transversely across and above the sedimentation zone. Mechanical drive means are provided for moving the bridge in a longitudinal path reciprocatingly and repetitively along the sedimentation zone between the end walls. A scraper blade is attached to the bridge, extending transversely across the sedimentation zone at the bottom thereof and having one end adjacent the solids collection trough whereby the solids settled in the bottom part of the sedimentation zone are collected and transferred by the blade to the solids collection trough during the travel of the blade along the sedimentation zone in both directions of movement. Means are provided for withdrawal of collected solids from the solids collection trough.

In accordance with the invention, the improvement thereof comprises the following. A first vertical tubular member, joined at its upper end to a part of the bridge transversely opposite the solids collection trough, terminates at its lower end at a point intermediate the bridge and the bottom part of the sedimentation zone. A second vertical tubular member, coaxially aligned with and telescopingly coupled at its upper end with the lower end of the first vertical tubular member, is joined at its lower end to a part of the scraper blade transversely opposite the solids collection trough whereby the scraper blade opposite part is suspended beneath the bridge. Means are provided for maintaining the second vertical tubular member in fixed vertical relationship to the first vertical tubular member during longitudinal movement of the bridge along the sedimentation zone whereby the scraper blade opposite part is maintained in position at the bottom part of the sedimentation zone during the longitudinal movement of the bridge. Cable means join a part of the bridge adjacent the solids collection trough and a part of the scraper blade adjacent the solids collection trough, for drawing the scraper blade adjacent part in a longitudinal path along the sedimentation zone during the longitudinal movement of the bridge in trailing relationship to the point of attachment of the cable means to the bridge such that the scraper blade is disposed at an acute angle with respect to the transversely extending bridge during the longitudinal movement thereof. Means are provided for shortening the suspended length of the cable means and means are provided for vertically upwardly translating the second vertical tubular member relative to the first vertical tubular member at the approach of the bridge to each of the aforementioned end walls of the sedimentation zone, whereby the scraper blade is drawn toward the end wall for transverse alignment therewith, and for increasing the suspended length of the cable means and for vertically downwardly translating the second vertical tubular member relative to the first vertical tubular member after the aforementioned transverse alignment upon reciprocal movement of the bridge toward the other end wall, so as to eliminate solids accumulation adjacent the end walls.

As used herein, the term "suspended length of the cable means" is taken as referring to length of the respective cable which is disposed for actively drawing the scraper blade along the longitudinal path of travel around the sedimentation zone, as measured linearly along such cable from its lower point of attachment to the scraper blade upwardly to either a point of attachment or other point of support of the cable. As analogized with the characteristics of a pendulum, the aforedescribed scraper arrangement may be regarded as comprising the part of the scraper blade adjacent the solids collection trough as a suspended body connected to an instantaneous point, i.e. the point of attachment or support, by the suspended cable length. Thus, as the suspended length of the cable is shortened at the approach of the bridge to the end wall, the scraper blade part adjacent the solids collection trough as a suspended body is induced to swing more or less freely toward the end wall, concurrently with the vertical upward translation of the second vertical tubular member relative to the first vertical tubular member, whereby the scraper blade is drawn toward the end wall for transverse alignment therewith.

Depending upon the relative rates of shortening of the suspended cable length and vertical upward translation of the second vertical tubular member relative to the first tubular member, and the specific structural features of the sedimentation zone and scraper apparatus, the scraper blade may remain relatively close to the bottom of the sedimentation zone as it moves toward the end wall for alignment or the blade may, at higher rates of shortening of the cable means and vertical upward translation of the second vertical tubular member relative to the first vertical tubular member, be lifted upwardly from the bottom and swung toward the end wall. In the first mode of operation, the scraper blade tends to avoid solids accumulation in the end wall regions by displacement of the settled solids and associated liquid from the bottom area in front of the blade face moving toward the end wall to the bottom areas behind the blade face, so that the displaced solids are removed from the end wall regions by the scraper blade during its reverse traverse when the suspended length of the cable means is increased and the second vertical tubular member is downwardly translated relative to the first vertical tubular member after the transverse alignment upon reciprocal movement of the bridge toward the other end wall. In the second mode of operation, the scraper blade passes over the sedimented solids in the end wall regions as it moves toward the end wall with subsequent removal of the solids by the scraper blade during its reverse movement in the same manner as described for the first mode. In the second mode of operation, it is particularly desirable to lift the scraper blade from the bottom by the aforementioned shortening of the cable means and vertical upward translation of the second vertical tubular member relative to the first vertical tubular member so that the scraper blade is swung toward the end wall and transversely aligned therewith above the bottom of the sedimentation zone and thereafter to lower the aligned scraper blade to the bottom of the sedimentation zone at the end wall by the aforementioned lengthening of the cable means and vertical downward translation of the second vertical tubular member relative to the first vertical tubular member prior to movement of the scraper blade toward the other end wall. It may also be suitable under the second mode of operation to momentarily shorten the suspended cable length and to vertically upwardly translate the second vertical tubular member relative to the first vertical tubular member as the bridge approaches the end wall so that the blade is swung over an arcuate trajectory toward the end wall so that the blade aligns which the end wall and recontacts the bottom of the sedimentation zone at more or less the same time.

The first mode of operation may be suitable in practice where the sedimented solids are finely dispersed, but where large solids and the solid extraneous matter are present, it is desirable to swing the blade over the settled solids as it moves toward the end walls, in order to avoid "packing" solids against the end walls such as would interfere with the proper transverse alignment of the scraper blade. In this respect, it may be desirable in some applications to further decrease the possibility of solids deposition in the end wall regions of the sedimentation zone by designing the bottom so that it curves or is bevelled upwardly to the end wall in such regions, thus eliminating sharp corners at the intersection of the bottom and end walls which tend to accumulate solids. Such geometry has been found to be particularly suitable in the case where the blade is lifted from the bottom of the sedimentation zone and then is lowered again to the bottom after transverse alignment with the end wall has been achieved, as described above.

In one preferred embodiment of the invention, the cable means comprise a first cable member and the means for shortening the suspended length of the cable means and means for vertically upwardly translating the second vertical tubular member relative to the first vertical tubular member at the approach of the bridge to each end wall of the sedimentation zone and for increasing the suspended length of the cable means and for downwardly translating the second vertical tubular member relative to the first vertical tubular member after the transverse alignment upon reciprocal movement of the bridge toward the other end wall includes a second cable member joined at its upper end to the part of the bridge transversely opposite the solids collection trough and joined at its lower end to the second vertical tubular member whereby the second tubular member is maintained in fixed vertical relationship to the first vertical tubular member during longitudinal movement of the bridge along the sedimentation zone. Rotatable roller means are mounted on the walls of the sedimentation zone and arranged for contact with the first and second cable members upon the approach of the bridge to an end wall of the sedimentation zone such that the first cable member initially engages the first rotatable roller member and is slidingly translated thereacross whereby the suspended length of the first cable member is shortened and thereafter the second cable member engages a second rotatable roller member and is slidingly translated thereacross whereby the suspended length of the second cable member is shortened and the second vertical tubular member is upwardly translated relative to the first tubular member, for the transverse alignment with the end wall, and whereby the suspended length of the first and second cable means are increased and the second vertical tubular member is vertically downwardly translated relative to the first vertical tubular member after the transverse alignment upon reciprocal movement of the bridge toward the other end wall of the sedimentation zone.

As used herein, the terms "flexible suspension means" and "cable means" are taken as referring to any suitable means as for example cables, ropes, wires or similar members, such as may be employed for joining a part of the bridge and a part of the scraper blade such that the so-joined part of the scraper blade is flexibly suspended from the bridge.

BRIEF DESCRIPTION OF THE DRAWINGS

FIG. 8 is partial section elevation drawing of the FIG. 7 sedimentation zone.

DESCRIPTION OF THE PREFERRED EMBODIMENTS

Figure 1:
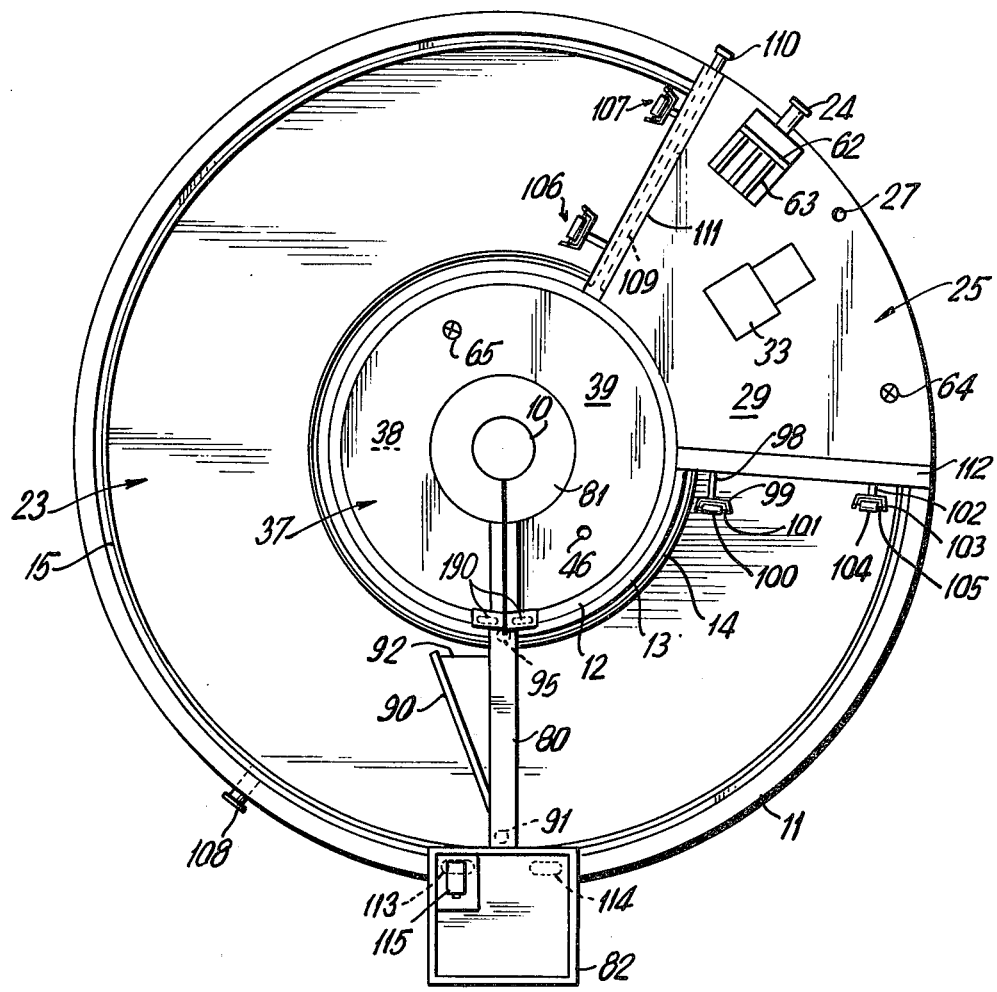
FIG. 1 is a plan view of an integral circular wastewater treatment plant incorporating the invention.

Referring now to the drawings, FIG. 1 is a plan view of an activated sludge integral circular wastewater treatment plant featuring a sludge collection and removal device constructed in accordance with the present invention. The illustrated plant is of a general type as disclosed and claimed in U.S. Pat. No. 3,890,231 to L. M. LaClair et al, incorporated herein to the extent pertinent. The plant includes circular tank outer wall 11 and circular inner wall 12 concentric with and spaced from the outer wall 11 forming an inner volume 38 and an intermediate volume between the inner and outer walls. The ratio of the inner wall radius ($R_1$) to the outer wall radius ($R_2$) in this plant is preferably between 0.25 and 0.70, for reasons to be discussed more fully hereinafter.

The illustrated plant comprises a plurality of treatment zones including arcuate first aeration zone 25, central second aeration zone 37, and first arcuate portion sedimentation zone 23. In this plant a first substantially radial partition 112 extends across the intermediate volume between and joined at opposite edges to the inner wall 12 and the outer wall 11. Second substantially radial partition 111 likewise extends across the intermediate volume between and joined at opposite edges to the inner and outer walls, being spaced from the first radial partition 112 to form the first arcuate portion sedimentation zone 23 in the intermediate volume bounded by segments of the inner and outer walls comprising 290° of their respective circumferences, and a second arcuate portion comprising the remainder of the intermediate volume and containing the aforementioned arcuate first aeration zone 25. In this manner, the sedimentation zone 23 is formed by spaced-apart, substantially parallelly aligned side walls and radial partition end walls joined to and disposed substantially at right angles with respect to the side walls to provide an enclosed sedimentation volume. As used herein, the terms "arcuate portion" and "arcuate zone" refer to enclosed parts of the integral circular plant bounded on the outside by the circular tank outer wall, on the inside by the circular inner wall, and on the ends by radially extended end walls with the circumferential length of the concentric inner and outer walls serving to define arc lengths of less than 360°.

As illustrated, first aeration zone 25 is an arcuate portion of the plant and is enclosed by overhead cover 29. Feed waste water is introduced to first aeration zone 25 through inlet conduit 24, stop gate 62 and bar screen 63.

Oxygen aeration feed gas is introduced through overhead conduit 27, and collected sludge solids recycled from sedimentation zone 23 by means of an opening in the wall member 111 communicating with outlet conduit 109. Slight positive gas pressure is maintained under the first aeration zone cover to prevent back mixing of gas between adjoining aeration zones 25 and 37. The first and second aeration zones are provided with pressure relief valves 64 and 65 respectively. First fluid mixing and recirculation means 33 are provided in the first aeration zone and may suitably comprise a rotatable impeller positioned at the liquor surface, a sub-surface propeller positioned beneath the impeller with a common shaft joining the impeller and propeller and extending through cover 29, and motor drive means connected to the shaft for rotation thereof. In such arrangement, the sub-surface propeller performs the function of continuous sub-surface mixing of the fluids, while the impeller throws liquor outwardly against the gas and performs the continuous recirculation function (of liquor). If the aeration zone is shallow, the surface impeller may perform both functions and a sub-surface impeller may be unnecessary. Other mechanical means for fluid mixing in recirculation may be employed, for example a system including a sub-surface propeller, a gas sparger and a gas recirculation pump joined to the gas space above the liquor and beneath the cover. In this alternative arrangement, the gas sparger may be positioned at the bottom end of a hollow vertical rotatable shaft, with the propeller also mounted on the shaft above the sparger. The gas recirculation pump may be mounted on the cover with its inlet side joined to the gas space by a conduit through the cover and the discharge side joined to the top end of the rotatable shaft for recirculation of oxygen gas to the sparger and thence into the liquor.

The collected sludge from sedimentation zone 23 is recycled to first aeration zone 25 at a rate so as to maintain the desired total solids concentration (MLSS) as for example 6000 mg/l and volatile suspended solids concentration (MLVSS) as for example 4500 mg/l Broad suitable ranges for these parameters are 4000–8000 mg/l MLSS and 3000–6000 mg/l MLVSS. The food-to-biomass ratio may be in the range of 0.3–1.55 gm $BOD_5$/day × gm MLVSS, for example about 0.68. The recycled sludge concentration (MLSS) is in the range of 10000–50,000 mg/l The oxygen gas is introduced in sufficient quantity to maintain dissolved oxygen concentration (D.O.) in the mixed liquor of 4–8 mg/l and for example 6 mg/l In order to control the D.O. of the mixed liquor, an oxygen control valve (not shown) may suitably be disposed in the oxygen feed gas conduit 27 and automatically adjusted in response to sensed oxygen vapor pressure in the gas space overlying the mixed liquor in the aeration zone by suitable sensing and control signal transmitting means as is well known in the art.

The previously described mechanical fluid mixing and recirculation system promotes transfer of oxygen to the mixed liquor in the first aeration zone 25, and the biomass assimilates and metabolizes BOD leading to production of $CO_2$, water and additional microorganisms. The fluids in the first aeration zone are mixed for the desired period, e.g. 45 minutes liquid residence time, and the resulting first oxygenated liquor is discharged through an opening in inner wall 12 below the liquor-gas interface to second aeration zone 37. Simultaneously, oxygen-depleted gas from the first aeration zone 25 is passed through first gas interzone transfer means such as an opening in the dividing segment of inner wall 12 above the liquor-gas interface to second zone 37 and the fluids are again mixed in this zone by second fluid mixing and recirculation means which may suitably be of the aforementioned type comprising a propeller, impeller, shaft, and motor (not shown for clarity). Second aeration zone 37 is enclosed by cover 39, and the operating parameters may be substantially the same as previously discussed in connection with the first aeration zone 25. After the desired liquor residence time as for example 45 minutes, the second oxygenated liquor is discharged from second zone 37 through liquor passage means in the inner wall 12 to sedimentation zone 23 bounded by inner wall 12, outer wall 11 and first and second radial partitions 111 and 112 respectively. Oxygen-further depleted gas is discharged from second aeration zone 37 through gas vent means 46. It will be noted that the gas discharge means from each of the first and second aeration zones 25 and 37 are spaced from the gas inlet means to the respective zones so as to avoid bypassing gradient. The oxygenated liquor entering sedimentation zone 23 flows radially across this zone toward the outer wall 11 and the solids are settled from the liquid during this radial path. Trough means 15 extend around the outer wall end segment of the sedimentation zone 23 for discharging clarified water therefrom. As used herein, trough means 15 include any means for collecting and removing solids-depleted liquid as for example the illustrated open conduit, or a submerged perforated conduit. The means provided for collecting and removing activated sludge settled solids from the bottom part of sedimentation zone 23, as described hereinafter, convey collected solids to the overhead receptacle trough 13 for return of at least part of the sludge to the first aeration zone 25. The non-recycled sludge is transferred by trough 13 to outlet conduit 109 in end wall 111, for discharge from the treatment system in conduit 110. This non-recycled sludge may thereafter be sent to sludge digestion and/or waste disposal means.

The provision of an arcuate sedimentation zone in the aforedescribed plant permits a highly efficient separation of the mixed liquor liquid-solid produced in the plant to be achieved. To effectively use the entire area provided in the clarifier, the length of the liquor flow path must be at least equal to and at peak flow conditions preferably identical with the path length necessary for sedimentation. If the sedimentation path is shorter than the actual path provided for liquor travel, then distribution of solids will occur over only part of the sedimentation zone area. Under these circumstances, the sedimentation zone has been over designed and the integral plant is larger than necessary. If the sedimentation path is longer than the actual path provided for liquor travel, then a gross loss of solids may occur in the clarifier effluent. In the aforedescribed type of plant, the clarifier arc length may be shortened to as little as 90° without causing the sedimentation path length to exceed the actual liquid flow path length, and the remaining peripheral portion of the plant may be employed for other purposes as for example, aeration, digestion of activated sludge, and chlorination of the clarifier effluent. To achieve the desired wastewater treatment with oxygen gas so as to effectively utilize the relatively expensive oxygen, reduce the BOD content of the effluent to an acceptable level and obtain activated sludge having superior settling characteristics, it is necessary to employ at least two separate oxygenaration zones with the oxygen depleted gas from the first zone being transferred to the second aeration zone and the first oxygenated liquor also being transferred to the second aeration zone.

As mentioned, the arc length of the sedimentation zone of this plant may be as low as 90° and still provide an actual liquid flow path length at least as long as the sedimentation path length. From a theoretical standpoint, it should be possible (if desired) to employ a fully extended 360° clarifier zone in the integral circular wastewater treatment plant, since at this arc length the sedimentation path based on idealized conditions is still less than the actual provided flow path length. However, for such an arc length in a fixed diameter plant, the inner to outer wall distance in the sedimentation zone is a minimum since the inner wall diameter must be increased to provide the entire required volume for at least two aeration zones. With such narrow sedimentation zone portion widths, the hydraulic effects associated with the sedimentation zone inlet and outlet disturbances become increasingly important and adversely affect sedimentation zone performance. For this reason, the sedimentation zone arcuate portion should not exceed 330° so as to obtain suitably long inner to outer wall widths and satisfactory hydraulic conditions at the inner wall where oxygenated liquor is introduced and at the outer wall where the clarified effluent is discharged.

It has previously indicated that the ratio of the inner wall radius ($R_1$) to the outer wall radius ($R_2$) in the general type of plant shown in FIG. 1 must be between 0.25 and 0.70. If $R_1/R_2$ exceeds 0.70 the intermediate volume becomes too narrow to accommodate arcuate aeration zones with uniformly good mixing characteristics, i.e., the zones would be excessively long relative to their width. Also, the arcuate sedimentation zone portion would be so narrow as to develop aberrant flow phenomena, with a prohibitively low actual liquor radial flow path to the outer wall. Such proximity of inlet and outlet areas is likely to promote channeling and short circuiting. If $R_1/R_2$ is less than 0.25, the center zone becomes very small in area compared to the total plant area. The inner wall of the arcuate sedimentation zone is then very short circumferentially and defines a very localized oxygenated liquor distribution area which tends to create turbulence which is detrimental to liquid-solids separation. A preferred balance of the foregoing considerations is an $R_1/R_2$ range between 0.30 and 0.60.

With regard now to the means for collecting and removing settled solids from the bottom part of the arcuate sedimentation zone in the FIG. 1 plant, the apparatus features a sludge solids collection trough 14 extending around the inner wall segment at the bottom of sedimentation zone 23. Bridge 80 extends transversely across and above the sedimentation zone and is powered by reciprocating mechanical drive means 115 which moves the bridge in an arcuate path reciprocatingly and repetitively around the arcuate sedimentation zone between the first and the second radial partitions 111 and 112 respectively. The bridge 80 is supported at the outer wall 11 by means of a roller assembly comprising rollers 113 and 114 disposed in structural frame 82. The first roller 113 is driven by the drive means 115 and both rollers 113 and 114 rest on the upper edge of the outer wall 11. The bridge 80 is supported on top of the cover 39 of the second aeration zone 37 by hub member 81. Situated on top of the hub 81 is air lift blower 10, which provides air to the solids removal conduit 95, as described more fully hereinafter. The bridge is also supported on rollers 190 on top of the inner wall 12, as shown by the roller means in dotted line representation.

Suspended from the bridge 80 is a scraper blade 90 extending transversely across the sedimentation zone at the bottom thereof with one end, the inner end, disposed adjacent the sludge solids collection trough 14. Cable means 92 join a part of the bridge adjacent the solids collection trough 14 and a part of the scraper blade adjacent the solids collection trough, for drawing the scraper blade adjacent part in a longitudinal path along the sedimentation zone during the longitudinal movement of the bridge in trailing relationship to the point of attachment of the cable means to the bridge such that the scraper blade is disposed at an acute angle with respect to the transversely extending bridge during the longitudinal movement thereof. The part of the scraper blade transversely opposite the solids collection trough is suspended beneath the bridge by an assembly of telescoping conduits, as described more fully hereinafter. The upper conduit or tubular member 91 is shown in dotted line representation in the drawing beneath bridge 80.

In the broad practice of the present invention, means are provided for shortening the suspended length of the cable means joining a part of the bridge adjacent the solids collection trough and a part of the scraper blade adjacent the solids collection trough and for vertically compressing the assembly of tubular conduits joining a part of the bridge transversely opposite the solids collection trough and a part of the scraper blade transversely opposite said solids collection trough, whereby the scraper blade is drawn toward the end walls of the sedimentation zone for transverse alignment therewith, and for increasing the suspended length of the cable means and for vertically expanding the tubular member assembly after transverse alignment upon reciprocal movement of the bridge toward an opposite end wall, so as to eliminate solids accumulation adjacent the end walls of the sedimentation zone. In the FIG. 1 embodiment of the invention, these means include the roller assemblies mounted on the radial partition 111 and 112 of the sedimentation zone 23. At the radial partition end wall 112, a first rotatable roller 100 is disposed on roller shaft 101 attached to bracket 99 in turn attached to spar member 98 which is joined to the partition wall 112. A second rotatable roller assembly is mounted on the outer portion of the radial wall 112, comprising rotatable roller member 104 disposed on roller shaft 105 attached to bracket 103 which is joined to spar member 102, with the latter being joined to the radial partition end wall 112. Similar rotatable roller assemblies 106 and 107 are positioned at the second radial partition end wall 111. The operation of these roller assemblies will be described in greater detail hereinafter.

Figure 2:
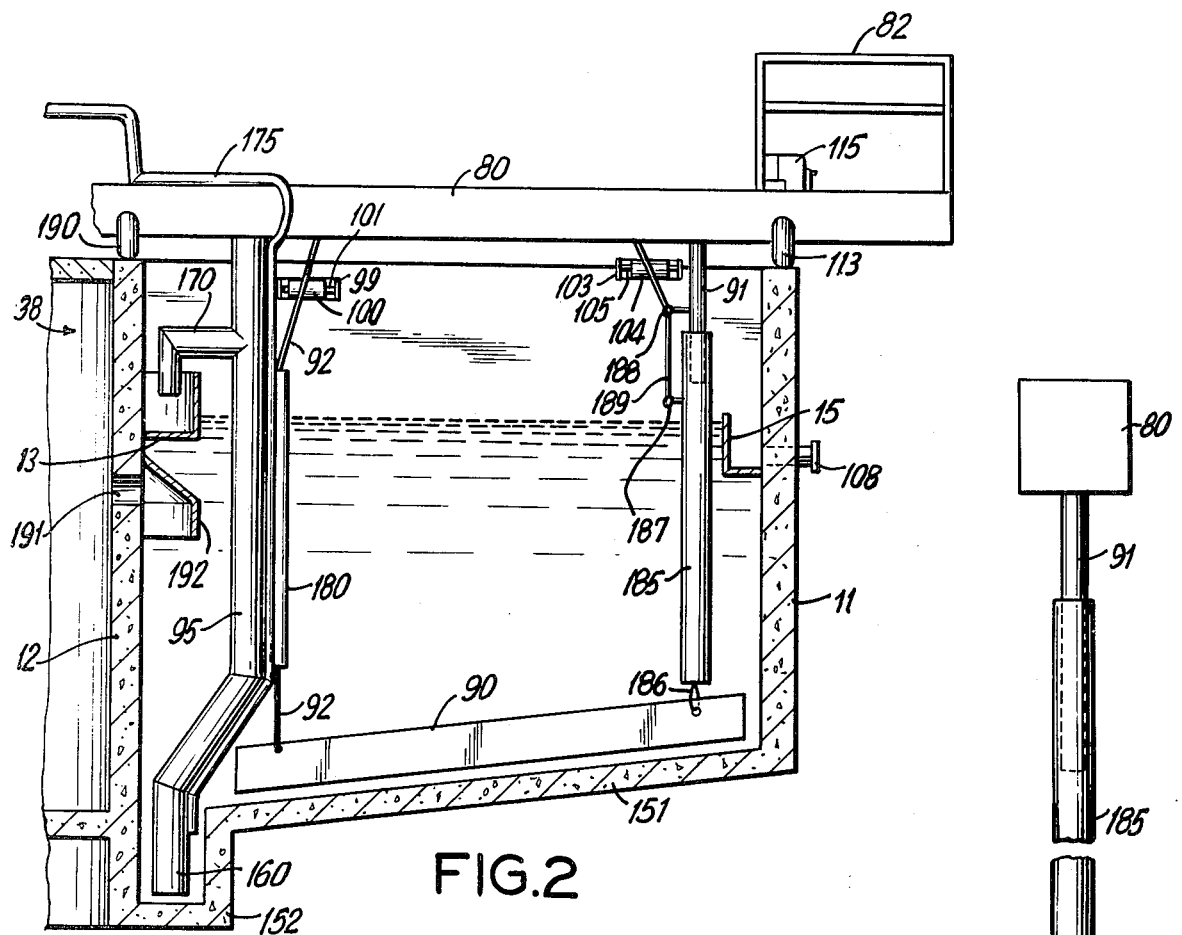
FIG. 2 is an elevation view of the FIG. 1 plant taken in cross-section showing the structural details of the solids collection and removal device.

FIG. 2 is an elevation view of the FIG. 1 plant taken in cross-section showing the structural details of the solids collection and removal means. In the apparatus, the means for introducing mixed liquor feed liquid-solids from the aeration zone 37 comprise spaced arrays of openings 191 in the inner circular segment of wall 12 separating the second aeration zone 37 from the arcuate sedimentation zone 23. These arrays of openings serve to uniformly distribute the feed liquid-solid around the inner wall segment for radial flow across the arcuate sedimentation zone. Upon introduction of the feed liquid-solid through openings 191, the feed liquid-solid is channeled downwardly in the arcuate sedimentation zone by the baffle member 192. During the subsequent radial flow of the liquid-solid across the sedimentation zone, the solids settle to the bottom floor 151 of the zone which slopes from the outer circular wall 11 radially downwardly toward the solids collection trough 152. These settled solids are moved by the scraper blade 90 into trough 152 while solids-depleted liquid is discharged from the upper part of the sedimentation zone by means of the effluent trough 15 which extends around the upper part of the outer wall segment of the arcuate sedimentation zone. Collected solids-depleted liquid from the effluent trough 15 is discharged from the plant in conduit 108.

Collected solids are withdrawn from the solids collection trough 152 by means of withdrawal conduit 95, whose lower end 160 terminates in the trough 152. Air is provided by the air blower outlet line 175 to the lower end 160 of withdrawal conduit 95 so that the latter functions as an air lift pump serving to convey withdrawn collected solids therethrough to discharge conduit 170 joined to the upper end of withdrawal conduit 95 and from thence into sludge trough 13 mounted on the upper part of the segment of inner circular wall 12 bounding the arcuate sedimentation zone.

As shown, the cable means joining a part of the bridge adjacent the solids collection trough and a part of the scraper blade adjacent the solids collection trough comprise a first cable member 92 which passes downwardly through a guide tube member 180 along a portion of the cable length. The purpose of the guide tube member 180, which is joined to the withdrawn solids conduit 95, is to retain the scraper blade 90 in position at the bottom of the sedimentation zone and to prevent fluctuation in the position of the scraper blade during movement of the scraper blade along the sedimentation zone.

The means for suspending the opposite part of the scraper blade beneath the bridge 80 includes a first vertical tubular member 91, joined at its upper end to a part of the bridge transversely opposite the solids collection trough 152, and terminating at its lower end at a point intermediate the bridge and the bottom part of the sedimentation zone. A second vertical tubular member 185 is coaxially aligned with and telescopingly coupled at its upper end with the lower end of the first vertical tubular member 91, with the former joined at its lower end to a part of the scraper blade 90 transversely opposite the solids collection trough 152 whereby the scraper blade opposite part is suspended beneath the bridge. In the broad practice of the present invention, means are provided for maintaining the second vertical tubular member in fixed vertical relationship to the first vertical tubular member during longitudinal movement of the bridge along the sedimentation zone whereby the scraper blade opposite part is maintained in position at the bottom part of the sedimentation zone during the longitudinal movement of the bridge. In the FIG. 2 embodiment of the invention, these means comprise a second cable member 189 joined at its upper end to the part of the bridge transversely opposite the solids collection trough 152 and joined at its lower end to the second vertical tubular member 185, via hook eyelet member 187. At a point intermediate its upper and lower ends, the second cable member 189 passes through an eyelet bolt member 188 joined to the first tubular member 91.

The mechanism whereby the suspended length of the first cable member 92 is shortened and the second vertical tubular member 185 is vertically upwardly translated relative to the first vertical tubular member 91 at the approach of the bridge to the end wall of the sedimentation zone and the mechanism whereby the suspended length of the first cable member 92 is increased and the second vertical tubular member 185 is downwardly translated relative to the first vertical tubular member 91 after the transverse alignment with the end wall upon reciprocal movement of the bridge toward the other end wall will now be described. As the bridge 80 approaches an end wall of the sedimentation zone, the first cable member 92 initially engages the first rotatable roller member 100 and is slidingly translated thereacross whereby the suspended length of the first cable member shortened. Thereafter, the second cable member 189 engages the second rotatable roller member 104 and is slidingly translated thereacross whereby the suspended length of the second cable member is shortened and the second vertical tubular member 185 is upwardly translated relative to the first vertical tubular member 91 for the aforementioned transverse alignment of the scraper blade with the end wall. After the aforementioned transverse alignment of the scraper blade with the end wall of the sedimentation zone and upon reciprocal movement of the bridge toward the other end wall of the sedimentation zone, the suspended length of the first and second cable means are increased and the second vertical tubular member 185 is vertically downwardly translated relative to the first vertical tubular member 191.

Figure 3:
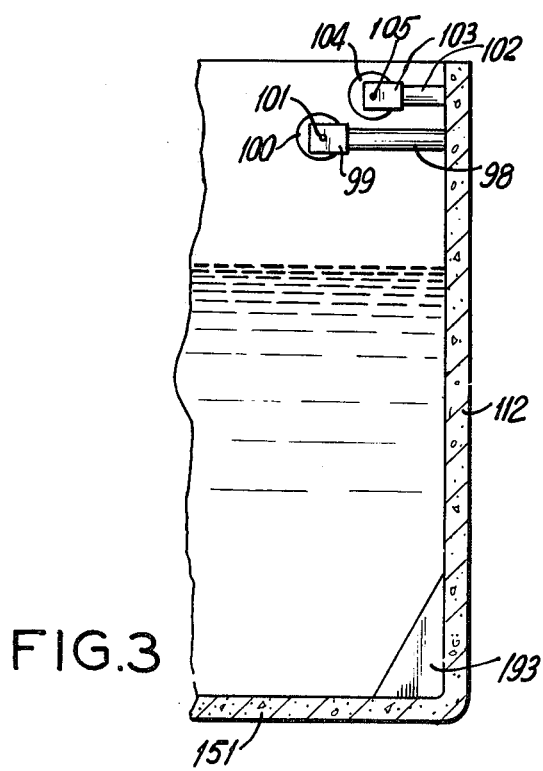
FIG. 3 is an elevation view of the FIG. 1 plant along the end wall region thereof.

FIG. 3 is an elevation view of a portion of the sedimentation zone adjacent the end wall 112. As shown, the first roller means comprising roller member 100 is mounted via spar member 98 at a position which is lower than the elevation of the second roller means comprising roller 104. As also shown, the sedimentation zone is provided with a fill 193 at the juncture of the end wall 112 with the floor 151 of the sedimentation zone. The purpose of fill 193 is to eliminate sharp corners at the intersection of the bottom 151 and end wall 112 which tend to accumulate solids. The fill 193 is scraped by the scraper blade in connection with the alignment of the scraper blade with the end wall 112, as will be shown more fully hereinafter.

Figure 4:
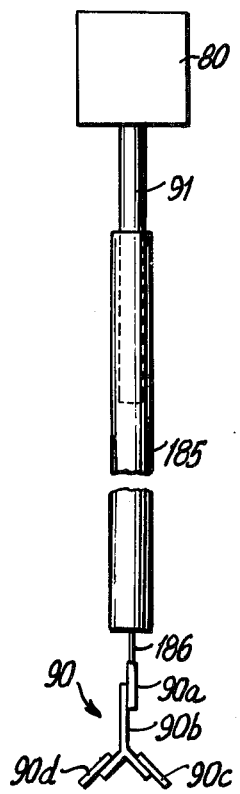
FIG. 4 is an elevation view of the FIG. 1 bridge and scraper blade assembly, showing the construction of the scraper blade.

FIG. 4 is an elevation view of a portion of the bridge and scraper assembly, showing the details of the scraper blade. As shown, the first tubular member 91 is joined at its upper end to the bridge 80 and terminates at its lower end at a point intermediate the bridge and the bottom part of the sedimentation zone. The second vertical tubular member 185 is coaxially aligned with and telescopingly coupled at its upper end with the lower end of the first vertical member 91 and is joined at its lower end to the scraper blade 90. Although the second vertical tubular member 185 as shown is of larger diameter than the first vertical tubular member 91, it will be recognized that the second vertical tubular member may be of smaller diameter than the first vertical tubular member, subject to the limitation that the second vertical tubular member is coaxially aligned with and telescopingly coupled at its upper end with the lower end of the first vertical tubular member. The lower end of the second vertical tubular member is joined to the scraper blade assembly 90 by means of a short cable member 186 which is attached to strap member 90a of the scraper blade assembly. Strap 90a is joined to trilateral brace member 90b. The actual blade elements in this structure comprise belting web members 90c and 90d respectively joined to the lower depending legs of trilateral brace member 90b. In this manner, belting web member 90c serves as the active blade element in one direction of movement of the assembly while belting web member 90d constitutes the active blade element in the reverse direction. Although the scraper blade assembly may be of the type as shown in FIG. 4, the scraper blade may also in practice be a flat plate type blade of a type conventionally employed in the art.

Figure 5:
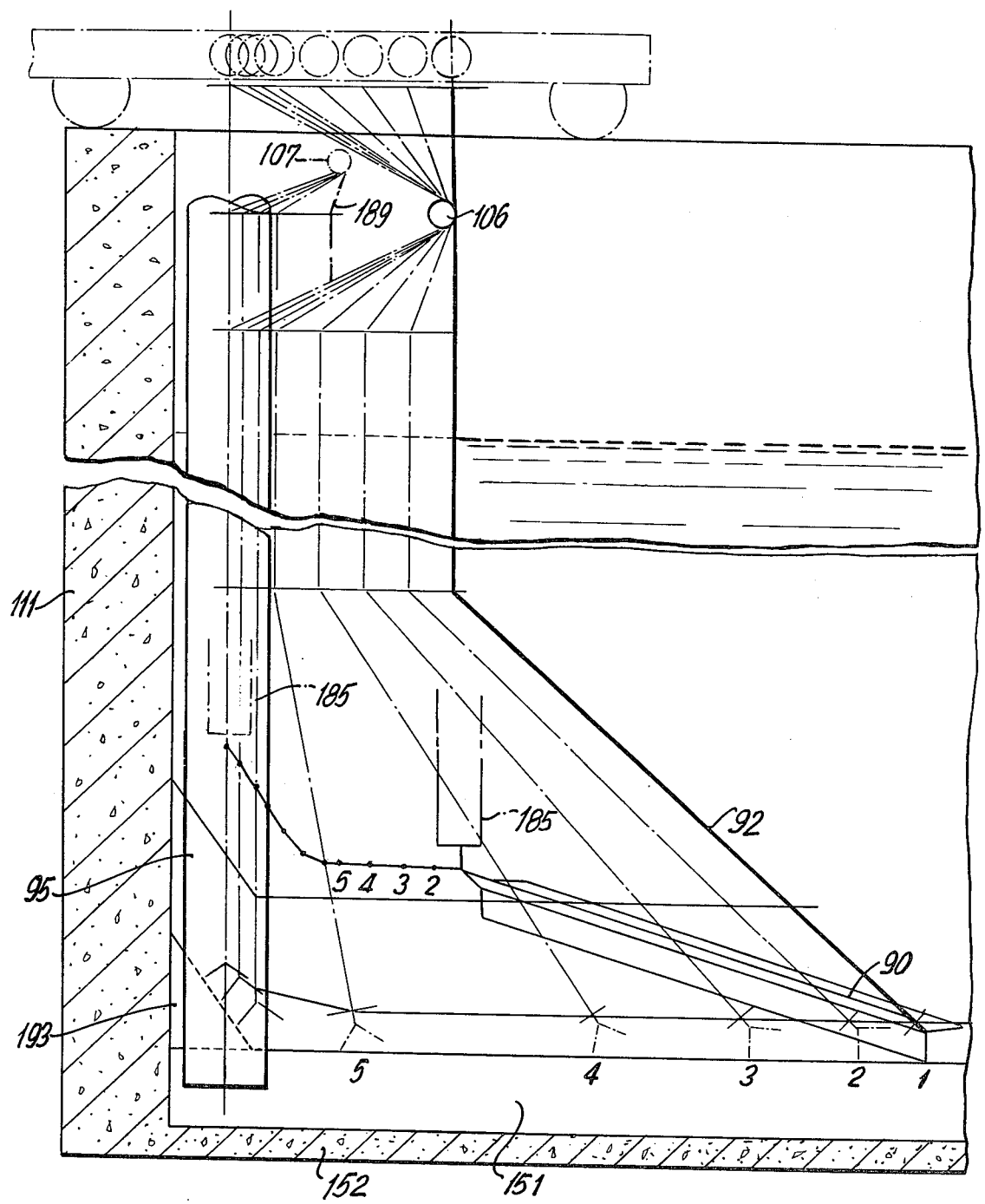
FIG. 5 is a time sequence drawing showing the alignment of the scraper blade with the end wall of the sedimentation zone.

FIG. 5 is an elevation view in cross section of the end wall region of the FIG. 1 plant illustrating the operation of the sludge scraper device during its approach to the end wall 111. At position 1, the cable means first cable member 92 is shown as it initially engages first roller member 106, while the first vertical tubular member 185 remains fully extended, i.e., the second vertical tubular member is at its lower-most vertical position relative to the first vertical tubular member. Positions 2, 3 and 4 illustrate how the first cable member 92 and the first roller member 104 cooperate in aligning the blade 90 with the end wall 111. Up to this point, the second cable member 189 attached to the second vertical tubular member 185 is fully extended. At position 5, the second cable member 189 first engages the second roller member 107 and thereafter its suspended length is gradually shortened. As a result, the second vertical tubular member 185 is vertically upwardly translated relative to the first vertical tubular member 91. In this manner, by the shortening of the suspended lengths of the first and second cable means, the scraper blade 90 is drawn up the elevated surface of fill 193 and transversely aligned with the end wall 111. After the transverse alignment of the scraper blade with the end wall 111, and upon reciprocal movement of the bridge toward the opposite end wall, the suspended lengths of the first and second cable members are lengthened and the second vertical tubular member is vertically downwardly translated relative to the first vertical tubular member so that the scraper blade assumes its operative position at the bottom of the sedimentation zone for collection of solids in the reverse direction.

Figure 6:
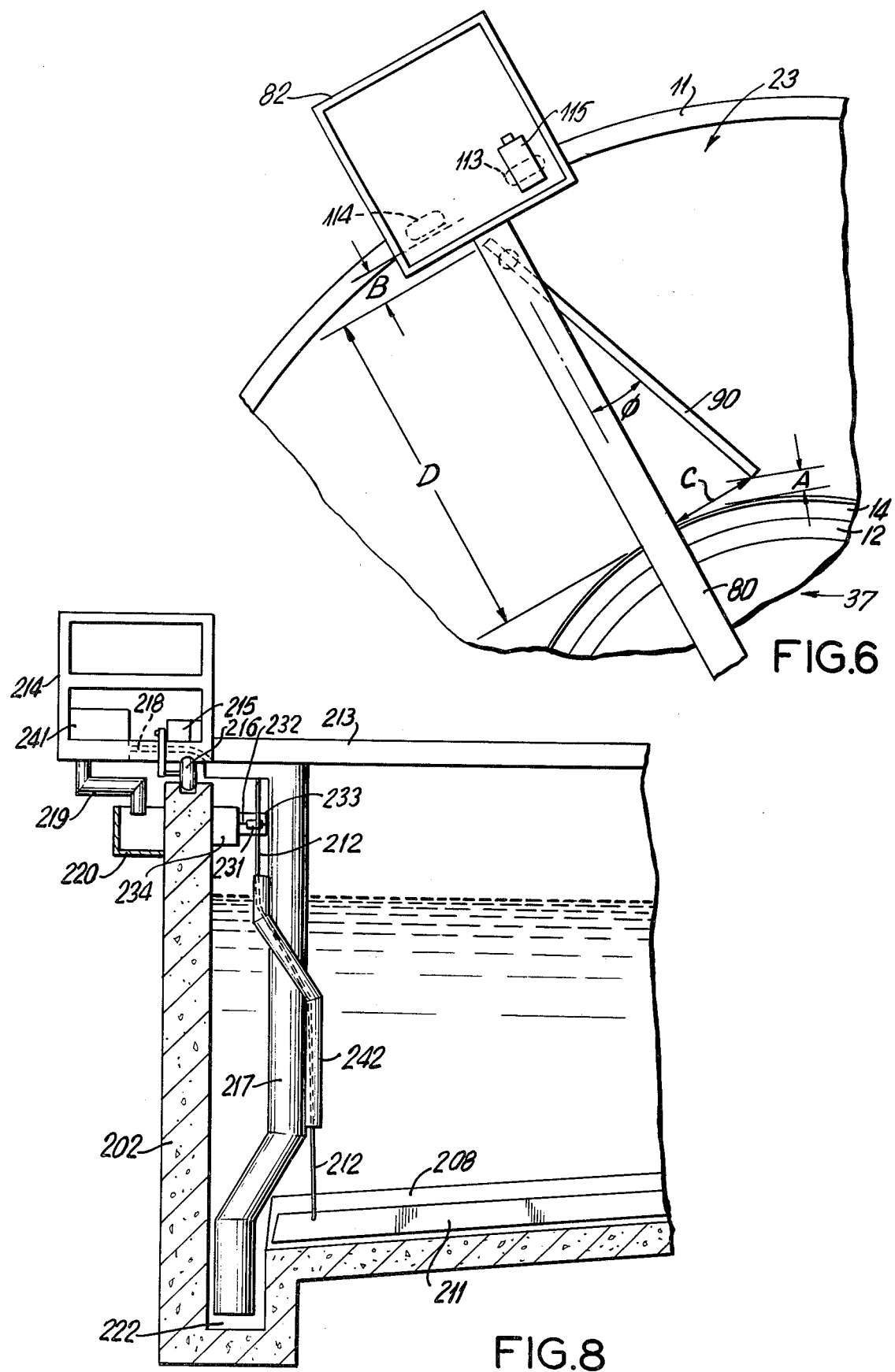
FIG. 6 is an enlarged sectional plan view of the scraper and bridge assembly of the FIG. 1 plant showing the dimensional characteristics of the apparatus.

FIG. 6 is an enlarged sectional plan view of the scraper and bridge assembly of the FIG. 1 plant showing the dimensional characteristics of the apparatus. With reference first to the plant as shown in FIG. 1, the diameter of the central aeration zone 37 may be 37.3 feet with the outer circular wall 11 having a diameter of 96.6 feet such that the ratio of the inner wall radius ($R_1$) to the outer wall ($R_2$) is 0.39. In such illustrative system, the aeration zones have a total volume of $1.98 \times 10^5$ gallons and aeration gas of 90% feed oxygen purity (by volume) is supplied to the aeration zones at a rate of 2840 SCFH. The Aerator power in the first aeration zone 25 is 30 nameplate horsepower (NHP) and in the second aeration zone 37 the aerator power is 25 NHP. The arcuate sedimentation 23 has a volume of $4.5 \times 10^5$ gallons with an effluent overflow rate, for a nominal daily flow of 3 MGD, of 600 gallons per day per square foot of sedimentation zone cross sectional area. Collected sludge solids are returned to the first aeration zone from the overhead sludge trough 13 at a volumetric sludge recycle ratio of 0.55. With this rate of activated sludge recirculation, the concentration of mixed liquor volatile suspended solids (MLVSS) in the aeration zones is maintained at 3500 mg/l. The arcuate sedimentation zone has an arc length of 294°. The first roller means are mounted 1.0 feet from the top of each end wall at a transverse distance of 4.0 feet from the inner wall 12, while the second roller means are positioned 0.25 feet from the top of each end wall at a transverse distance of 3.3 feet from the outer wall 11. The bottom of the arcuate sedimentation zone is sloped radially downwardly from the outer wall 11 to the sludge trough 14 at a rate of 1.0 feet increase in depth for each 12 feet of radial distance; thus, the difference in depth between the floor adjacent the outer wall and the floor adjacent the sludge trough is 2.25 feet.

Referring now to FIG. 6, for the above described illustrative system, the scraper blade 90 has a length of 27 feet and a height of 0.54 feet. The curvilinear speed of the blade is 0.03 RPM. The sludge collection trough 14 has a width of 2 feet. The length of the cable means joining the part of the scraper blade adjacent the solids collection trough with a part of the bridge adjacent the solids collection trough is 17.5 feet while the length of the fully extended assembly of first and second vertical tubular members is 16 feet.

During operation, the sludge scraper blade is drawn by the bridge around the arcuate sedimentation zone 23 such that the scraper blade is disposed at an acute angle with respect to the transversely extending bridge, as measured by the angle $\phi$ in the FIG. 6 drawing, which is preferably in the range of 10° to 26°. It has been found that with values of the angle $\phi$ greater than 26°, the clearances between the inner and outer ends of the scraper blade and the sludge trough and outer wall respectively become too large for effective operation. These clearances are shown in FIG. 6 as the radial distance A measured between the inner end of scraper blade 90 and the outer end of sludge solids collection trough 14 and as the radial distance B measured between the outer end of scraper blade 90 and the outer wall 11. Dimension C is the distance measured along a tangent to the outer edge of the sludge collection trough 14 in the direction of rotation from the point of intersection of the tangent with the outer circumference of the trough to the point of intersection with the scraper blade. Dimension D is the radial distance from this tangent to the outer end of the scraper blade. Table 1 below presents data which illustrates how the various dimensional variables A, B, C, and D change with a change in the length of the cable means joining a part of the scraper blade adjacent the solids collection trough with a part of the bridge adjacent the solids collection trough.

TABLE I

DIMENSIONS OF SCRAPER BLADE ORIENTATIONS FOR VARIOUS LENGTHS OF THE SCRAPER BLADE CABLE MEANS 92

| Length of Cable means 92[1] (Ft.) | Dimensional Parameters | | | | |
|---|---|---|---|---|---|
| | A (Ft.) | B[2] (In.) | C (Ft.) | D (Ft.) | $\phi$ (Degrees) |
| 16.2 | 0.58 | 2.3 | 4.37 | 24.73 | 10 |
| 17.5 | 1.56 | 2.8 | 6.51 | 24.68 | 15 |
| 21.1 | 4.75 | 4.3 | 11.03 | 24.56 | 26 |
| 22.5 | 6.18 | 5.0 | 12.58 | 24.50 | 30 |

[1]The lower end of the guide tube member 180 is held constant at 8.33 feet from bridge 80.
[2]The distance from the outer end of scraper blade 90 to the second vertical tubular member is 1.88 feet.

The angle $\phi$ is preferably not less than 10° to provide effective movement of collected solids by the scraper blade transversely into the solids collection trough.

Figure 7:
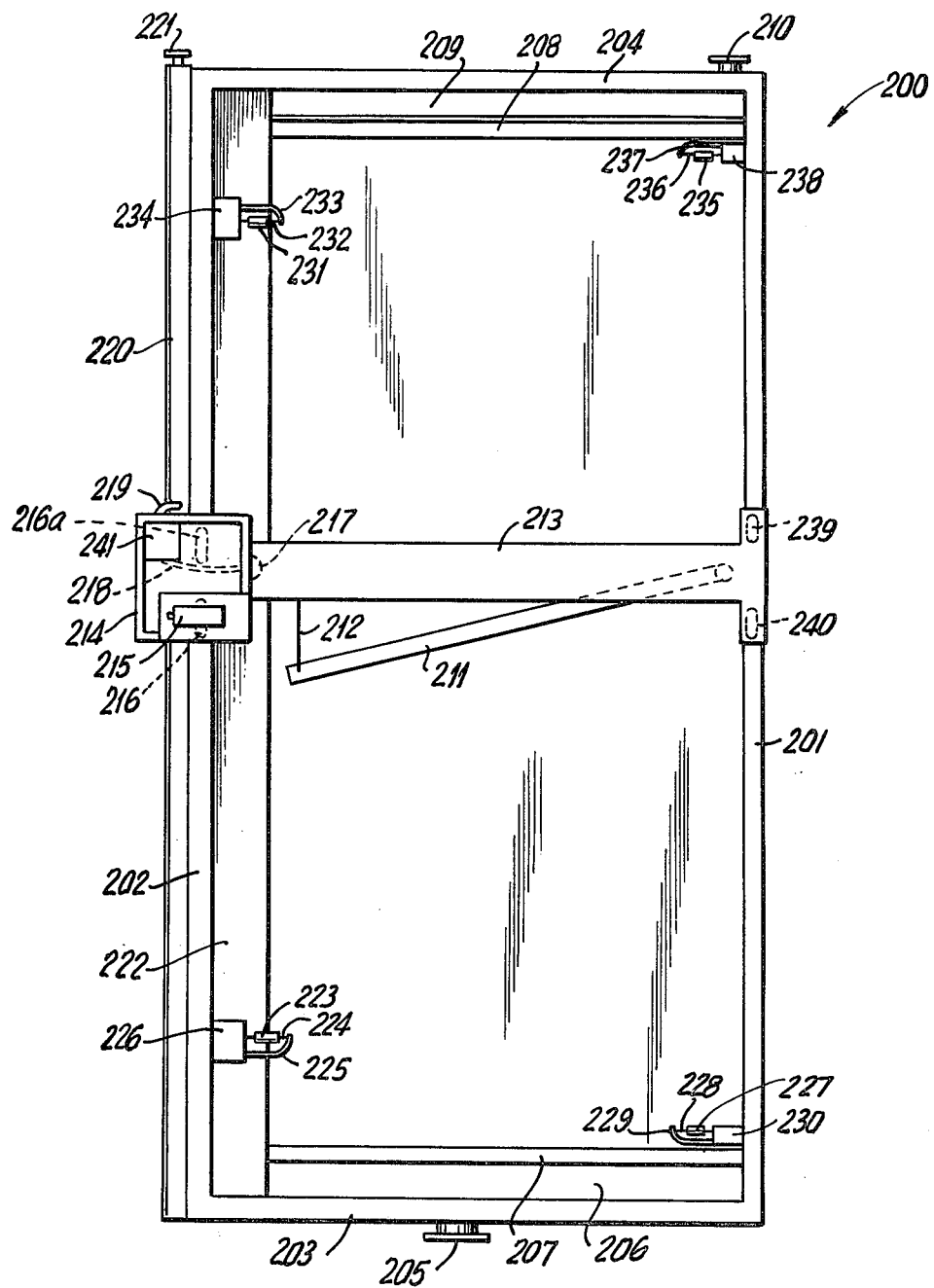
FIG. 7 is a plan view of a rectangular sedimentation zone incorporating the invention.

FIG. 7 is a plan view of a rectangular sedimentation zone featuring the solids collection and removal system of the present invention. The sedimentation zone 200 is formed by spaced-apart, substantially parallelly aligned side walls 201 and 202 and end walls 203 and 204 joined to and disposed substantially at right angles with respect to the side walls to provide an enclosed sedimentation volume.

In operation, feed liquid-solid is introduced to the sedimentation zone through feed conduit 205 and is distributed along the end wall 203 by feed distribution baffle 206. In this manner the feed liquid-solid flows longitudinally across the sedimentation zone 200 to form a solids-depleted liquid in the upper part of the zone and a layer of settled solids in the bottom part thereof. Effluent solids-depleted liquid is discharged from the sedimentation zone at the overflow effluent trough 209 positioned at the upper portion of the end wall 204 and passes out of the plant in effluent conduit 210 joined to the effluent trough 209.

In this embodiment, solids collection trough 222 extends along the side wall 202 at the bottom of the sedimentation zone. Bridge 213 extends transversely across and above the sedimentation zone. Mechanical drive means 215 are provided in the structural frame member 214 for moving the bridge in a longitudinal path reciprocatingly and repetitively along the sedimentation zone between the end walls. As shown, the bridge is supported on the side wall 201 by the roller members 239 and 240. The bridge is supported on side wall 202 by roller members 216 and 216a, with the former roller being driven by the mechanical drive means 215. Scraper blade 211 is attached to the bridge 213, extending transversely across the sedimentation zone at the bottom thereof and having one end adjacent the solids collection trough 222 whereby the solids settled in the bottom of the sedimentation zone are collected and transferred by the blade to the solids collection trough during the travel of the blade along the sedimentation zone in both directions of movement. Means are provided for withdrawal of collected solids from the solids collection trough 222. These means comprise a solids withdrawal conduit 217 which is connected by pump line 218 to pump 241. Pump 241 serves to pump collected solids from the solids collection trough 222 through the conduit 217, pump line 218 and discharge line 219 into solids discharge trough 220, attached to the side wall 202 of the sedimentation zone. From the solids discharge trough 220, collected solids are discharged from the system in conduit 221 attached to the solids discharge trough 220. Cable 212 joins a part of the bridge adjacent the solids collection trough 222 and a part of scraper blade adjacent the solids collection trough, for drawing the scraper blade adjacent part in a longitudinal path along the sedimentation zone during the longitudinal movement of the bridge in trailing relationship to the point of attachment of the cable means to the bridge such that the scraper blade is disposed at an acute angle with respect to the transversely extending bridge during the longitudinal movement thereof. The part of the scraper blade transversely opposite the solids collection trough 222 is suspended beneath the bridge by means of an assembly of first and second vertical tubular members substantially as shown and described in connection with FIG. 2.

In this embodiment, the means for shortening the suspended length of the cable means 212 and means for vertically upwardly translating the second vertical tubular member relative to the first vertical tubular member at the approach of the bridge to each end wall of the sedimentation zone, whereby the scraper blade is drawn the end wall for transverse alignment therewith, and for increasing the suspended length of the cable means 212 and for vertically downwardly translating the second vertical tubular member relative to the first vertical tubular member after the transverse alignment upon reciprocal movement of the bridge toward the other end wall comprise rotatable roller means mounted on the side walls of the sedimentation zone. These roller means operate substantially in the same manner as described for the roller means of the FIG. 2 embodiment of the invention. In the vicinity of the end wall 204, a first roller member 231 is disposed on axle 232 in turn supported by brace 233 and support strut 234. On side wall 201, a roller member 235 is disposed on axle 236 supported by brace 237 and support strut 238. In like manner, in the vicinity of end wall 203, first roller member 223 is disposed on axle 224 supported by brace 225 and support strut 226. On side wall 201, second roller member 227 is disposed on axle 228 supported by brace 229 and support strut 230. Each of the end wall regions has an upwardly inclined fill 207 and 208 at the intersection of the end walls and the bottom of the sedimentation zone which are constructed in a manner similar to that shown in FIG. 3 herein.

FIG. 8 is elevation view of a portion of the FIG. 7 plant which shows how the first roller member 231 cooperates with the cable means 212 in aligning the scraper blade 211 with the end wall. As shown, sludge withdrawal conduit is mounted on the bridge with lower end positioned in the solids collection trough 222. The upper end of sludge withdrawal conduit 217 is in flow communication with the pump line 218, by means of which collected solids are withdrawn from the solids collection trough 222 in sludge withdrawal conduit 217, pumped through line 218 by pump 241 and discharged in collected solids discharge line 219 to the solids discharge trough 220. A guide tube member 242 is attached to the sludge withdrawal conduit 217 with its upper end located on the inner side of sludge withdrawal conduit 217 and the lower end located on the outer side of sludge withdrawal conduit 217. The cable means 212 comprises a cable member which is connected at its lower end to solids scraper blade 211. The cable member passes through the guide tube member 242 along a portion of its length and has its upper end connected to the upper end of sludge withdrawal conduit 217 adjacent the bridge 213. As the bridge 213 approaches an end wall of the sedimentation zone, the cable member 212 engages the roller 231 and is slidingly translated thereacross to shorten the suspended length of the cable means. As the bridge 213 continues to approach the end wall, the cable means 212 is drawn up through the guide tube member 242 thereby drawing the scraper blade 211 into alignment with the end wall and then up the fill 208 located at the end wall bottom portion. The first and second roller members associated with the side walls are positioned such that the scraper blade 211 is essentially parallel to the bridge 213 at the base of each fill, and the scraper blade is raised up the face of the fill at such a rate that the scraper blade is effectively parallel to the tank bottom as the bridge stops to change direction. In this fashion, the entire bottom portion of the tank is scraped.

Although preferred embodiments have been described in detail it will be appreciated that other embodiments are contemplated only with modifications of the disclosed features, as being within the scope of the invention.

What is claimed is:

1. In a system for separation of a liquid-solid mixture by sedimentation in a sedimentation zone formed by spaced-apart, substantially parallelly aligned side walls and end walls joined to and disposed substantially at right angles with respect to said side walls to provide an enclosed sedimentation volume; means for introducing and distributing feed liquid-solid in said sedimentation zone for sedimentation therein to form a solids-depleted liquid in the upper part of said zone and a layer of settled solids in the bottom part thereof; means for discharging solids-depleted liquid from said upper part of said sedimentation zone; a solids collection trough extending along the bottom of said sedimentation zone; a bridge extending transversely across and above said sedimentation zone; mechanical drive means for moving said bridge in a longitudinal path reciprocatingly and repetitively along said sedimentation zone between said end walls; a scraper blade attached to said bridge, extending transversely across said sedimentation zone at the bottom thereof and having one end adjacent said solids collection trough whereby said solids settled in the bottom part of said sedimentation zone are collected and transferred by said blade to said solids collection trough during the travel of said blade along said sedimentation zone in both directions of movement; and means for withdrawal of collected solids from said solids collection trough; the improvement comprising: a first vertical tubular member, joined at its upper end to a part of said bridge transversely opposite said solids collection trough, and terminating at its lower end at a point intermediate said bridge and the bottom part of said sedimentation zone; a second vertical tubular member, coaxially aligned with and telescopingly coupled at its upper end with the lower end of said first vertical tubular member, and joined at its lower end to a part of said scraper blade transversely opposite said solids collection trough whereby said scraper blade opposite part is suspended beneath said bridge; means for maintaining the second vertical tubular member in fixed vertical relationship to said first vertical tubular member during longitudinal movement of said bridge along said sedimentation zone whereby said scraper blade opposite part is maintained in position at the bottom part of said sedimentation zone during said longitudinal movement of said bridge; flexible suspension means joining a part of said bridge adjacent said solids collection trough and a part of said scraper blade adjacent said solids collection trough, for drawing said scraper blade adjacent part in a longitudinal path along said sedimentation zone during said longitudinal movement of said bridge in trailing relationship to the point of attachment of said flexible suspension means to said bridge such that said scraper blade is disposed at an acute angle with respect to said transversely extending bridge during said longitudinal movement thereof; means for shortening the suspended length of said flexible suspension means and means for vertically upwardly translating said second vertical tubular member relative to said first vertical tubular member at the approach of said bridge to each said end wall of said sedimentation zone, whereby said scraper blade is drawn toward the end wall for transverse alignment therewith, and for increasing the suspended length of said flexible suspension means and for vertically downwardly translating said second vertical tubular member relative to said first vertical tubular member after said transverse alignment upon reciprocal movement of said bridge toward the other end wall, so as to eliminate solids accumulation adjacent said end walls.

2. Apparatus according to claim 1 wherein said side walls comprise circular wall segments concentric with one another enclosing an arcuate sedimentation volume.

3. Apparatus according to claim 2 wherein said solids collection trough extends around the inner wall segment of said arcuate sedimentation zone.

4. Apparatus according to claim 1 wherein said means for withdrawal of collected solids comprise a conduit mounted to said bridge and having a lower end positioned in said solids collection trough and an upper end disposed in flow communication with a sludge receptacle, and pump means mounted on said bridge and joined to said conduit for moving withdrawn solids therethrough.

5. Apparatus according to claim 4 wherein said flexible suspension means pass through a guide tube member joined to the withdrawn solids conduit along a portion of the cable length.

6. Apparatus according to claim 1 wherein said flexible suspension means comprise a first cable member and wherein said means for shortening the suspended length of said flexible suspension means and means for vertically upwardly translating said second vertical tubular member relative to said first vertical tubular member at the approach of said bridge to each said end wall of said sedimentation zone and for increasing the suspended length of said flexible suspension means and for vertically downwardly translating said second vertical tubular member relative to said first vertical tubular member after said transverse alignment upon reciprocal movement of said bridge toward the other end wall comprise: a second cable member joined at its upper end to said part of said bridge transversely opposite said solids collection trough and joined at its lower end to said second vertical tubular member whereby said second vertical tubular member is maintained in fixed vertical relationship to said first vertical tubular member during longitudinal movement of said bridge along said sedimentation zone, and rotatable roller members mounted on the walls of the sedimentation zone and arranged for contact with the first and second cable members upon said approach of said bridge to said end wall of said sedimentation zone such that said first cable member initially engages a first rotatable roller member and is slidingly translated thereacross whereby the suspended length of the first cable member is shortened and thereafter the second cable member engages a second rotatable roller member and is slidingly translated thereacross whereby the suspended length of the second cable member is shortened and said second vertical tubular member is upwardly translated relative to said first vertical tubular member, for said transverse alignment with said end wall, and whereby the suspended lengths of said first and second cable members are increased and said second vertical tubular member is vertically downwardly translated relative to said first vertical tubular member after said transverse alignment upon reciprocal movement of said bridge toward the other end wall of said sedimentation zone.

7. Apparatus according to claim 6 wherein said rotatable roller members are mounted on the end walls of said sedimentation zone.

8. Apparatus according to claim 6 wherein said rotatable roller members are mounted on the side walls of said sedimentation zone.

9. In a wastewater treatment apparatus comprising a circular tank outer wall; a circular inner wall concentric with and spaced from said outer wall forming an inner volume and intermediate volume between said inner and outer walls, such that the ratio of the inner wall radius ($R_1$) to the outer wall radius ($R_2$) is between 0.25 and 0.70; a first substantially radial partition extending across said intermediate volume between and joined at opposite edges to said inner and outer walls; a second substantially radial partition extending across said intermediate volume between and joined at opposite edges to said inner and outer walls, being spaced from said first substantially radial partition so as to form a first arcuate portion sedimentation zone in said intermediate volume bounded by segments of said inner and outer walls comprising between 90° and 330° of their respective circumferences and a second arcuate portion comprising the remainder of said intermediate volume, first fluid mixing and recirculation means within said outer wall in a first part other than said first arcuate portion and a cover enclosing said first part positioned over said first fluid mixing and reciculation means to form a first aeration zone; first passage means for introducing oxygen gas in said first aeration zone; second passage means for introducing feed wastewater and thickened activated sludge to said first aeration zone; second fluid mixing and recirculation means within said outer wall in a second part other than said first arcuate portion and a second cover enclosing said second part positioned over said second fluid mixing and recirculation means to form a second aeration zone; first gas interzone transfer means spaced from said first passage means for discharging oxygen-depleted gas from said first aeration zone and introducing same to said second aeration zone as the oxygen-containing gas therefor; first liquor interzone transfer means for discharging first oxygenated liquor from said first aeration zone and introducing same to said second aeration zone for mixing therein with said oxygen-containing gas; gas vent means spaced from said first gas interzone transfer means for discharging oxygen-further depleted gas from said second aeration zone; means for discharging second oxygenated liquor from said second aeration zone; means for uniformly distributing oxygenated liquor in said first arcuate portion sedimentation zone in said intermediate volume around the inner wall segment for radial flow across said first arcuate portion sedimentation zone for both clarification of said liquor and thickening of activated sludge therein; means disposed around the upper part of said outer wall segment of said first arcuate portion sedimentation zone for discharging clarified water therefrom; a sludge collection trough extending around said inner wall segment at the bottom of said sedimentation zone; a bridge extending transversely across and above said sedimentation zone; mechanical drive means for moving said bridge in an arcuate path reciprocatingly and repetitively around said arcuate sedimentation zone between said first and second substantially radial partitions; a scraper blade attached to said bridge, extending transversely across said sedimentation zone at the bottom thereof and having one end adjacent said sludge collection trough whereby said sludge solids settled in the bottom part of said sedimentation zone are collected and transferred by said blade to said sludge collection trough during the travel of said blade along said sedimentation zone in both directions of movement; and means for withdrawal of collected sludge solids from said sludge collection trough; the improvement comprising: a first vertical tubular member, joined at its upper end to a part of said bridge transversely opposite said sludge collection trough, and terminating at its lower end at a point intermediate said bridge and the bottom part of said sedimentation zone; a second vertical tubular member, coaxially aligned with and telescopingly coupled at its upper end with the lower end of said first vertical tubular member, and joined at its lower end to a part of said scraper blade transversely opposite said sludge collection trough whereby said scraper blade opposite part is suspended beneath said bridge; means for maintaining the second vertical tubular member in fixed vertical relationship to said first vertical tubular member during longitudinal movement of said bridge along said sedimentation zone whereby said scraper blade opposite part is maintained in position at the bottom part of said sedimentation zone during said longitudinal movement of said bridge; flexible suspension means joining a part of said bridge adjacent said solids collection trough and a part of said scraper blade adjacent said solids collection trough, for drawing said scraper blade adjacent part in a longitudinal path along said sedimentation zone during said longitudinal movement of said bridge in trailing relationship to the point of attachment of said flexible suspension means to said bridge such that said scraper blade is disposed at an acute angle with respect to said transversely extending bridge during said longitudinal movement thereof; means for shortening the suspended length of said flexible suspension means and means for vertically upwardly translating said second vertical tubular member relative to said first vertical tubular member at the approach of said bridge to each said substantially radial partition end wall of said sedimentation zone, whereby said scraper blade is drawn toward the end wall for transverse alignment therewith, and for increasing the suspended length of said flexible suspension means and for vertically downwardly translating said second vertical tubular member relative to said first vertical tubular member after said transverse alignment upon reciprocal movement of said bridge toward the other end wall, so as to eliminate solids accumulation adjacent said end walls.

\* \* \* \* \*